United States Patent

Rappold et al.

[11] Patent Number: 5,888,465
[45] Date of Patent: Mar. 30, 1999

[54] PROCESS FOR SEPARATING HYDROGEN HALIDES FROM GASES CONTAINING SULPHUR DIOXIDE

[75] Inventors: Ulrich Rappold, Rossdorf; Wolfgang Schick, Frankfurt; Jörg Schmid, Hürth; Joachim Semel, Eppstein; Heinrich Merten, Bad Soden; Matthias Schubert, Niedernhausen; Gerhard Luft, Mühltal, all of Germany

[73] Assignee: Hoechst Aktiengesellschaft, Frankfurt, Germany

[21] Appl. No.: 793,433

[22] PCT Filed: Sep. 6, 1995

[86] PCT No.: PCT/EP95/03497

§ 371 Date: Feb. 25, 1997

§ 102(e) Date: Feb. 25, 1997

[87] PCT Pub. No.: WO96/09245

PCT Pub. Date: Mar. 28, 1996

[30] Foreign Application Priority Data

Sep. 19, 1994 [DE] Germany ............................ 44 33 246.7

[51] Int. Cl.⁶ .................................................. B01D 53/34
[52] U.S. Cl. .......................................... 423/240 S; 95/132
[58] Field of Search ................................ 423/240 S, 539; 95/132; 502/340, 341

[56] References Cited

U.S. PATENT DOCUMENTS

| | | |
|---|---|---|
| 3,278,266 | 10/1966 | Welch . |
| 3,653,811 | 4/1972 | Zagoeskaya .......................... 423/240 R |
| 4,201,751 | 5/1980 | Holter et al. ............................ 423/240 |
| 4,639,259 | 1/1987 | Pearson .................................. 423/248 |
| 4,786,484 | 11/1988 | Nelson .................................... 423/239 |
| 4,859,438 | 8/1989 | Lindbauer et al. ...................... 423/239 |
| 4,908,195 | 3/1990 | Wanner et al. ....................... 423/240 S |
| 4,950,464 | 8/1990 | Fujioka et al. .......................... 423/468 |

FOREIGN PATENT DOCUMENTS

| | | |
|---|---|---|
| 0 463 367 | 1/1992 | European Pat. Off. ............ 423/240 S |
| 2101882 | 3/1972 | France . |
| 1085506 | 7/1960 | Germany . |
| 287 912 | 12/1970 | U.S.S.R. ................................ 423/539 |
| 2 200 621 | 8/1988 | United Kingdom ............... 423/240 S |

*Primary Examiner*—Ngoc-Yen Nguyen
*Attorney, Agent, or Firm*—Frommer Lawrence & Haug LLP

[57] ABSTRACT

Disclosed and claimed is a process for selectively separating hydrogen halides from sulfur-dioxide-containing gases by using an adsorbent made from a porous ceramic support material which is impregnated with an alkaline earth metal salt solution and, after evaporation of the solvent, the alkaline earth metal salt is pyrolysed at 200° to 800° C. to give alkaline earth metal oxide .$Xh_2O$, where x is a number from 0 to 1.

2 Claims, No Drawings

PROCESS FOR SEPARATING HYDROGEN HALIDES FROM GASES CONTAINING SULPHUR DIOXIDE

CROSS-REFERENCE TO RELATED APPLICATION

This application claims priority to German Application No. P 44 33 246.7 filed Sep. 19, 1994, and International Application No. PCT/EP95/03497 filed Sep. 6, 1995, published as WO96/09245 Mar. 28, 1996.

BACKGROUND OF THE INVENTION

1. Field of the Invention

Most of the known processes for removing hydrogen halides from gas mixtures are based on the use of solutions or suspensions of chemicals which bind the hydrogen halides by the absorption principle. In this case, principally solutions and suspensions of alkali metal compounds or alkaline earth metal compounds such as oxides, hydroxides or carbonates are used.

In many absorption processes used industrially, contact of generally hot gases with a liquid absorbent leads to a marked decrease in the gas temperature. Because of the highly corrosive character of many water-containing gas mixtures if the dew point is undershot and the difficult removal of cold gases via a stack, the gas mixture must often be reheated after the absorption, which markedly impairs the energy balance of the process.

In addition, many alkali metal compounds and alkaline earth metal compounds, in particular sodium hydroxide and potassium hydroxide, are extremely aggressive substances, so that safety precautions must be taken in the operation and maintenance of the apparatus for treating the gas mixtures.

Adsorption processes do not have these disadvantages since the temperature is not decreased and thus the dew point is not undershot, for which reason reheating the gas mixture after removal of the hydrogen halides is not necessary. Furthermore, aqueous systems which contain aggressive substances are bypassed in adsorption processes.

2. Description of the Related Art

U.S. Pat. No. 3,278,266 describes the adsorption of hydrogen halide from vapour mixtures of organic compounds. The adsorbent comprises an oxidic compound of the second main group of the Periodic Table of the Elements which is applied to a support and may be regenerated by desorption.

Surprisingly, it has now been found that such an adsorbent offers the possibility of selectively adsorbing hydrogen halide from a sulfur-dioxide-containing gas and thus of separating hydrogen halide from sulfur dioxide.

OBJECT OF THE INVENTION

The object of the invention is to selectively separate hydrogen halides from sulfur-dioxide-containing gases, thus, separating hydrogen halide from sulfur dioxide at a constant temperature by using an adsorption process according to the present invention.

SUMMARY OF THE INVENTION

The invention thus relates to the use of an adsorbent made of a porous ceramic support material which is impregnated with an alkaline earth metal salt solution, in which, after evaporation of the solvent, the alkaline earth metal salt is pyrolysed at 200° to 800° C. to give alkaline earth metal oxide $\cdot x\, H_2O$, where x is a number from 0 to 1, for the selective separation of hydrogen halides from sulfur-dioxide-containing gases.

DETAILED DESCRIPTION OF THE INVENTION

The invention is described in detail below, in particular in its preferred embodiments.

A solution of alkaline earth metal salt is introduced into the pores of the ceramic support material. The ceramic support material can be produced on a basis of $SiO_2$ or, in particular, $Al_2O_3$, or else using aluminum silicates, zeolytes or other ceramic starting materials. The alkaline earth metal salts which serve are salts, individually or in a mixture, which form an activated oxide on heating to 200° to 800° C. Magnesium salt solutions are preferably used, e.g. magnesium carbonate, magnesium chloride, magnesium nitrate or, in particular, magnesium acetate. The supports are dried, then the alkaline earth metal salt is converted into an activated alkaline earth metal oxide at the temperature necessary for pyrolysis in the pores. A pyrolysis temperature as low as possible is desirable, since this increases the adsorption activity of the adsorbent produced.

The invention now offers the possibility of selectively adsorbing hydrogen halide, preferably hydrogen chloride, from a sulfur-dioxide-containing gas and thus of separating sulfur dioxide. Hydrogen halide is adsorbed onto the adsorbent at the temperature range in question between 80 and 200° C., especially at 100° to 150° C., sulfur dioxide passing unhindered through the bed. In contrast to processes which operate at elevated temperature, no alkaline earth metal sulfate is formed in this case. This is a great advantage, since otherwise, during a regeneration, alkaline earth metal sulfate cannot be regenerated to form active MgO, so that the capacity for repeated hydrogen halide adsorption would not be provided.

The adsorbent laden with hydrogen bromide, hydrogen iodide or, in particular, hydrogen chloride, can then be desorbed at elevated temperatures between 100° and 800° C., preferably at 400° to 450° C. In this case, the adsorbent must be flushed with a water-containing, oxygen-free gas stream, in order to decompose the alkaline earth metal halide precipitated in the pores of the support to give the corresponding hydrogen halide and alkaline earth metal oxide. Alternatively, to desorb the adsorbent laden with hydrogen bromide, hydrogen iodide or hydrogen chloride, a dry, oxygen-containing atmosphere can be used in the same temperature range. In this case, in addition to active alkaline earth metal oxide, the corresponding halogen is formed. The adsorbent thus regenerated can be reused for adsorption purposes.

For further understanding of the invention, a preferred embodiment is described in the form of an example.

EXAMPLES

Example 1

250 ml (bed height 10 cm) corresponding to approximately 260 g of the adsorbent produced by U.S. Pat. No. 3,278,266 (3.1% by weight of magnesium oxide) are used in a cylindrical fixed-bed tubular adsorber for the adsorption of hydrogen chloride. The gas volumetric flow rate is 1.6 $m^3(STP)/h$. The temperature in the adsorber is 120° C. The gas comprises nitrogen containing 7.5% by volume of oxygen, 10% by volume of steam and 2,000 mg/m³ (STP) of hydrogen chloride and 2,800 mg/m³ (STP) of sulfur dioxide. The adsorption time is 5 hours.

| Result: | |
|---|---|
| Hydrogen chloride loading of the adsorbent at the beginning: | 0% by weight |
| Hydrogen chloride loading of the absorbent at the end: | 3.4% by weight |
| Hydrogen chloride breakthrough after 50 minutes: | 10% |
| Hydrogen chloride breakthrough after 100 minutes: | 23% |
| Hydrogen chloride breakthrough after 300 minutes: | 64% |
| Sulfur dioxide breakthrough at the beginning: | 70% |
| Sulfur dioxide breakthrough at the end: | 100% |

We claim:

1. A process for selectively separating hydrogen halides from sulfur-dioxide-containing gases comprising the step of contacting the gases with an adsorbent at a temperature range of between 80° and 200° C., wherein said adsorbent is made by:

impregnating a porous ceramic support material with an alkaline earth metal salt solution, evaporating the solvent, and pyrolyzing the alkaline earth metal salt at 200° to 800° C. to give alkaline earth metal oxide $XH_2O$, wherein x is a number from 0 to 1.

2. The process of claim 1, wherein the temperature range is from 100° to 150° C.

* * * * *